UNITED STATES PATENT OFFICE.

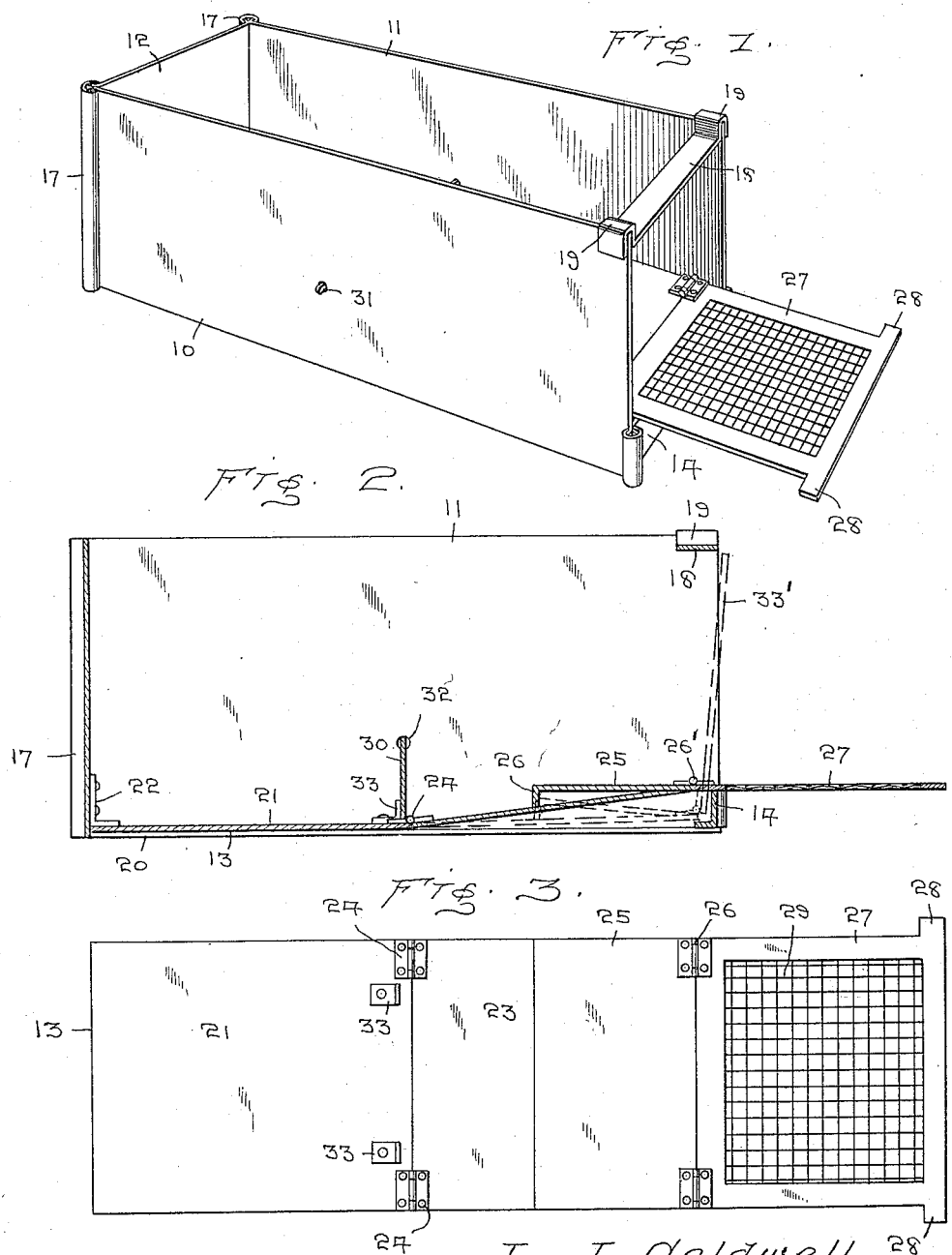

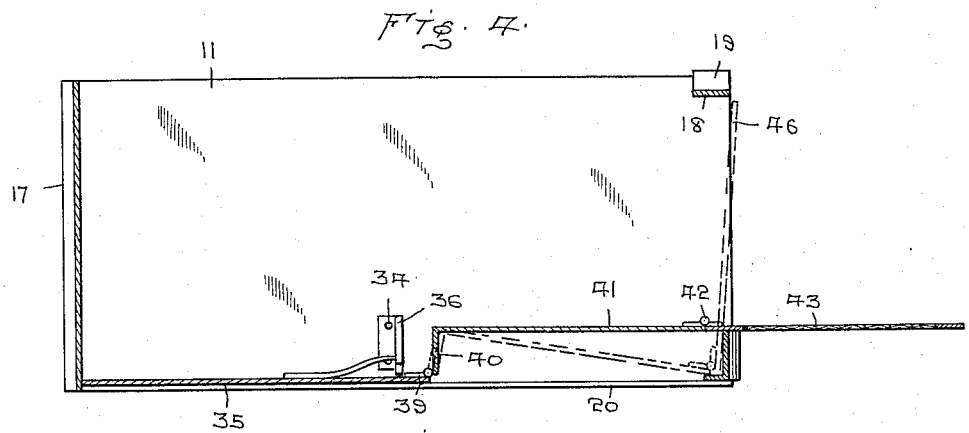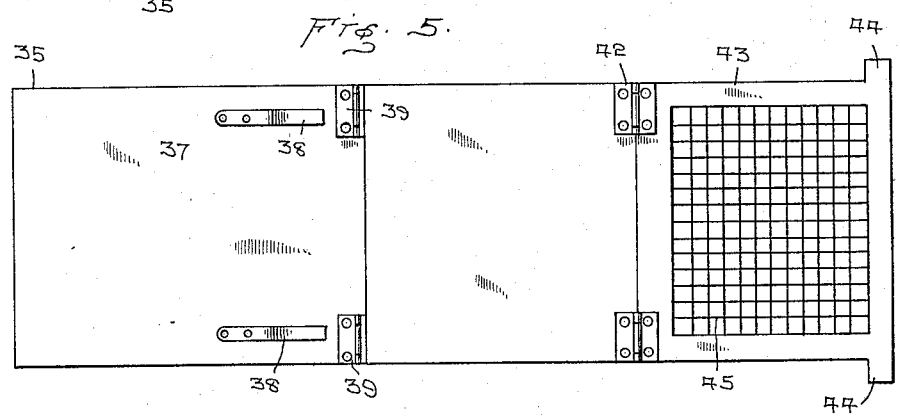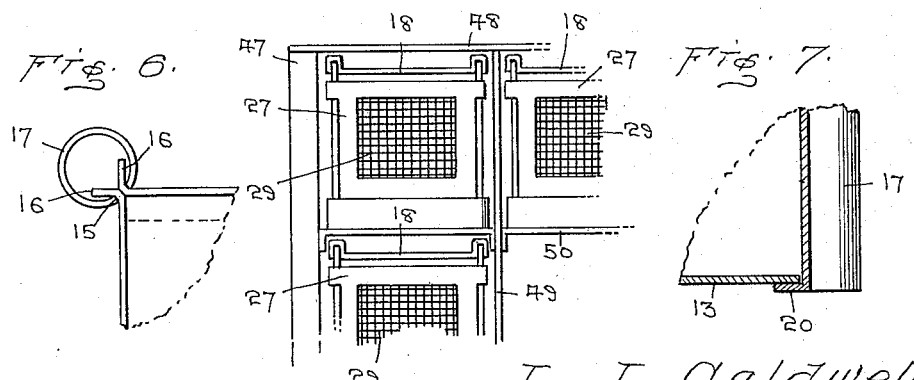

JOHN J. CALDWELL, OF OCONTO, WISCONSIN.

TRAP-NEST.

1,149,340. Specification of Letters Patent. Patented Aug. 10, 1915.

Application filed April 16, 1914. Serial No. 832,253.

*To all whom it may concern:*

Be it known that I, JOHN J. CALDWELL, a citizen of the United States, residing at Oconto, in the county of Oconto and State of Wisconsin, have invented certain new and useful Improvements in Trap-Nests; and I do hereby declare the following to be a full, clear, and exact description of the invention, such as will enable others skilled in the art to which it appertains to make and use the same.

This invention relates to nests for fowls and has particular reference to that type of such devices known as trap-nests.

As a principal object this invention contemplates the provision of a nest which will be self-closing on the entrance of the fowl and thereby prevent the exit of the fowl until it is desired to release the same and will also prevent the entrance of other fowls while the nest is occupied.

A further object is to provide a trap-nest of the foregoing type which will be readily collapsible for the purpose of washing and scalding, essential feature of sanitary nests.

An object of equal importance with the foregoing is to provide a trap-nest of the type described which is constructed with such regard to proportion, number and arrangement of parts as to be cheaply manufactured, will be durable and efficient in operation, and may be readily set up or taken down with a minimum expenditure of time and labor and without requiring the use of any tools.

The above and additional objects are accomplished by such means as are illustrated in the accompanying drawings, described in the following specification, and then more particularly pointed out in the claims which are appended hereto and form a part of this application.

With reference to the drawings wherein I have illustrated the preferred embodiment of my invention and a modification and throughout the several views of which like characters of reference designate similar parts, Figure 1 is a perspective view of my complete device as it appears when set for the entrance of a fowl, Fig. 2 is a longitudinal section showing in dotted lines the closed portion of the trap, Fig. 3 is a plan view of the removable bottom detached from the nest, Fig. 4 is a longitudinal section of a modified form of my device, Fig. 5 is a plan view of the detachable bottom used in connection with the modified form shown in Fig. 4, Fig. 6 is a detail of the removable joint used in the structure of both forms of my nest, Fig. 7 is a detail transverse section through the floor of my nest and Fig. 8 is a partial front elevation of a cabinet containing a plurality of nests.

Referring now to the drawings and more particularly to those figures showing the preferred form of my invention it will be seen that the nest proper consists of the sides 10 and 11, the end 12, the removable bottom 13, and the partial front wall 14. The vertical meeting faces 15 of the sides 10 and 11 with the end walls 12 and 14 are beveled as shown in Fig. 6 and flanges 16 are formed on the outer ends of these beveled portions and at right-angles to the body portions of the sides and end walls respectively and a cylindrical resilient member 17 provided with a vertical slit receives the beveled portions in holding the sides and ends together and is kept in place by the angular flanges 16 previously mentioned. It will be noted that this construction provides a box-like structure which is readily capable of disassemblage by merely sliding the cylindrical resilient keeper 17 vertically upward until out of engagement with the beveled portions 15. It will be further noted in this connection that all parts of my trap-nest previously described and all parts to follow except where specific description is included are preferably made of sheet metal so that they may be easily washed and scalded in order to keep the nest free from vermin and entirely sanitary.

The front wall 14, as has been noted, only partially covers the front opening of the nest, as is clearly shown in Fig. 1. As a further means of spacing the side walls 10 and 11 adjacent their front extremities, I provide the transverse brace 18 formed with the integral inverted U-shaped members 19, the arms of said members being spaced sufficiently to admit of the entrance of the side walls therebetween. The lower portions of the side walls are formed with the right-angular flange 20 upon which the movable bottom 13 is adapted to slide as shown in Fig. 7. This removable bottom 13 is formed of 3 sections hingedly connected, which constitute the trap portion of the nest. The rear section 21 is adapted to slide upon the flanges 20 of the side walls 10 and 11 when being removed, but is normally secured by any desirable means, such as brackets 22 in Fig. 2, to the rear wall 12. The forward end of the portion 21 is hingedly connected to the second portion 23 as shown at 24. The forward end of this portion 23 is in turn connected by soldering or any other desirable means to the trap panel 25, which when set occupies the horizontal position shown in Fig. 2, and which is provided with the right-angular downwardly extending flange 26, which bears upon the intermediate panel 23 at its forward end and innerly of the front wall 14. This trap panel 25 is hingedly connected as at 26' to the gate or closure member 27. This gate 27 consists of a substantially rectangular frame having integral ears or lateral extensions 28 formed on the outer edges and is adapted to be covered with wire 29. The movement of this trap will be hereinafter more fully described.

As a transverse partition for my nest I provide the partial inner wall 30, which is formed at its upper outward extremities with the ears 31, which project through suitable apertures 32 formed in the side walls 10 and 11 so as to removably secure the same when the box is assembled. It will be apparent from Fig. 2 that this inner partition 30 is so positioned as to have any forward movement prevented by the pivots of the hinges 24, and as a means for preventing any backward movement I provide the angular lugs or braces 33, which are secured to the panel 21 of the bottom 13.

In operation the trap is set as indicated in Fig. 2 of the drawings and a nest is made or placed in the inward compartment formed by the partition 30. The fowl in approaching the nest steps upon the gate 27, then in a horizontal position, and continuing steps next upon the trap panel 25, when it is apparent that the weight of the fowl will force the panel 25 and the connected panel 23 into the position shown by the dotted lines, the last named panel swinging on the hinge 24, and the resulting movement forcing the gate 27 to swing upwardly upon the hinge 26 to assume the position shown in dotted lines at 33'. The lugs 28 will engage with the forward ends of the sides 10 and 11 and prevent any further backward movement of the gate, thus forming an effectual closure to the nest. It is of course obvious that the fowl has no means of releasing itself from the nest until the gate 27 is once more pulled down into its horizontal position by the proprietor of the nest.

Turning now to the modification of my invention as disclosed in the second sheet of drawings, it will be apparent that the main structure of the nest is essentially similar to that already described, differing only in the construction of the movable bottom and the transverse partition. In this form the partition is dispensed with and in its place there are secured to the walls 10 and 11 the lugs 34, which are spaced slightly from the bottom flange 20 in order to permit of the sliding bottom 35 being positioned therebetween. These lugs 34 each have a right-angular flange 36 extending a short distance into the nest. Fixed upon the innermost panel 37 of the slidable bottom 35 are the leaf springs 38, which are normally engaged with the flange 36, as shown in Fig. 2, to prevent the withdrawal of the bottom. At the forward end of this panel 37 is provided the hinge 39 which is connected to the vertical flange 40 of the trap panel 41. This trap panel 41 is hinged at 42 with a gate or closure member 43, which is in all respects similar to the gate 27 of the previous form of my invention, being provided with the outwardly extending catch members 44 and covered with the wire mesh material 45.

The operation of this modified form is substantially similar to that already described, the weight of the fowl upon the trap panel 41 being sufficient to depress the same on the hinges 39 into the position shown in the dotted lines of Fig. 4, the gate 43 swinging upward to assume the vertical position shown at 46, the catch members 44 operating as before to limit such upward movement. In this form of my invention, however, it is possible to remove the slidable bottom 35 without disassembling the box of the nest by simply pressing down upon the leaf spring 38 and pulling the bottom forward until the springs have cleared the flange 36 in which event the bottom can then be readily pulled out.

In Fig. 8 I have shown a number of my trap nests arranged in tiers for the convenient supervision of the proprietor thereof. It will have been seen in the foregoing that no top or cover has been provided for my nest and it is not desirable that such be provided with the nests when used as shown in this figure. The cabinet is preferably made of angle iron and T-iron and includes side walls 47 a cover 48 and vertical partitioning walls 49, the resulting compartments being further divided off by the members 50 so that a space is left in each compartment sufficient to receive a trap nest of the foregoing description.

While in the foregoing I have illustrated in the drawings and described in the specification such combination and arrangements of elements as constitute the preferred embodiment of my invention and the principal modification thereof, I desire to emphasize the fact that I may make such minor changes in the matters of proportion and degree in the later adaptations of my device as shall not alter the spirit of my invention as defined in the appended claims.

What I claim is:

1. In a collapsible sheet metal trap-nest end walls side walls, independent means for removably securing said end walls to said side walls, removable means for bracing and spacing said side walls, a transverse partition pivotally mounted on said side walls, a removable bottom and means carried by said removable bottom for holding said pivoted partition stationary.

2. In a collapsible sheet metal trap nest, end walls side walls, independent removable means for securing said end walls to said side walls, removable bracing means for said side walls, a transverse partition pivotally mounted on said side walls, flanges formed along the lower edges of said side walls, a bottom panel slidable upon said flanges, a second panel hingedly connected to said first panel and animal operated means connected to said second panel for closing the nest.

3. In a collapsible sheet metal trap nest having a partially open end, end walls, side walls, independent means for removably securing said end walls to said side walls, removable bracing means for said side walls, flanges formed along the bottom of said side walls, a pivoted transverse partition carried by said side walls a removable bottom panel slidable upon said flanges, means carried by said panel and holding said pivoted partition against movement in one direction, a second panel hingedly connected to said first panel, said hinged connection preventing the partition from moving in the other direction, a closure member for said partially open end and means carried by said second panel and adapted to be actuated by a fowl for operating said closure member.

4. In a collapsible sheet metal trap nest having a partially open end, end walls, side walls, independent means for removably securing said end walls to said side walls, removable bracing means for said side walls, flanges formed along the bottom of said side walls, a pivoted transverse partition carried by said side walls, a removable bottom panel slidable upon said flanges means carried by said panel for holding said pivoted partition against movement in one direction, a second panel hingedly connected to said first panel said hinged connection preventing the partition from moving in the other direction, a closure member for said partially open end, and a trap panel connected to said closure member and carried by said second panel, said trap panel being adapted to be actuated by the weight of a fowl to operate said closure member.

5. In a collapsible sheet metal trap nest having a partially open end, end walls, side walls, independent means for removably securing said end walls to said side walls, removable bracing means for said side walls, flanges formed along the bottom of said side walls, a pivoted transverse partition carried by said side walls, a removable bottom panel slidable upon said flanges means carried by said panel for holding said pivoted partition against movement in one direction a second panel hingedly connected to said first panel, said hinged connection preventing the partition from moving in the other direction, a closure member for said partially open end and means carried by said closure member and adapted to contact with the ends of said side walls for limiting the movement of said closure member.

6. In a collapsible sheet metal trap-nest having a partially open end, end walls, side walls, independent means for removably securing said end walls to said side walls, removable bracing means for said side walls, a partition carried by said side walls, flanges formed along the lower edges of said side walls, removable panels slidably positioned upon said flanges, separate means carried by said panels contacting with said partition on opposite sides to normally prevent movement of the partition, and a closure member hingedly connected to said panels.

7. In a collapsible sheet metal trap-nest having a partially open end, end walls, side walls, independent means for removably securing said end walls to said side walls, removable bracing means for said side walls, a partition carried by said side walls, flanges formed along the lower edges of said side walls, removable panels slidably positioned upon said flanges, separate means carried by said panels and contacting with said partition on opposite sides to normally prevent movement of said partition, a trap panel secured to said movable panels, and a closure member hingedly connected to said trap panel and adapted to be operated to close said open end when said trap panel is actuated by the weight of the fowl.

In testimony whereof I have signed my name to this specification in the presence of two subscribing witnesses.

JOHN J. CALDWELL.

Witnesses:
S. F. FORD,
H. E. CALDWELL.

Copies of this patent may be obtained for five cents each, by addressing the "Commissioner of Patents, Washington, D. C."